United States Patent [19]
Kahn et al.

[11] Patent Number: 5,566,047
[45] Date of Patent: Oct. 15, 1996

[54] ELECTRICAL APPARATUS WITH NOISE-SUPPRESSING FEATURE

[75] Inventors: Michael J. Kahn, Shorewood; Donald Wandler, Racine, both of Wis.

[73] Assignee: Ruud Lighting, Inc., Racine, Wis.

[21] Appl. No.: 490,104

[22] Filed: Jun. 5, 1995

[51] Int. Cl.$^6$ .................................................. H02B 1/18
[52] U.S. Cl. ............................ 361/674; 174/DIG. 2; 174/138 G; 174/166 S; 248/635; 248/638; 336/100; 361/810
[58] Field of Search ............................ 174/138 G, 138 E, 174/166 S, DIG. 2; 248/635, 638; 336/100; 361/674, 807–810

[56] References Cited

U.S. PATENT DOCUMENTS

| | | |
|---|---|---|
| 4,000,406 | 12/1976 | Bhavsar ............................ 174/DIG. 2 |
| 4,859,977 | 8/1989 | Mochizuki et al. .................... 336/100 |
| 4,875,140 | 10/1989 | Delpech et al. ...................... 174/138 G |

FOREIGN PATENT DOCUMENTS

| | | | |
|---|---|---|---|
| 895642 | 9/1953 | Germany ............................... 248/635 |
| 1437678 | 5/1972 | United Kingdom .................. 248/635 |

*Primary Examiner*—Gregory D. Thompson
*Attorney, Agent, or Firm*—Jansson & Shupe, Ltd.

[57] ABSTRACT

Disclosed is an AC electrical apparatus including a vibrating device and a mounting structure supporting the device. In the improvement, a resilient insulator is interposed between the device and the mounting structure so that vibrations are isolated from the mounting structure. In a highly preferred embodiment, the insulator has a disc-like component between a standoff spacer and the mounting structure. Another such component is between the mounting structure and the head of the bolt which attaching the device to the structure. And a tube-like component of the insulator is between the bolt and such structure.

5 Claims, 2 Drawing Sheets

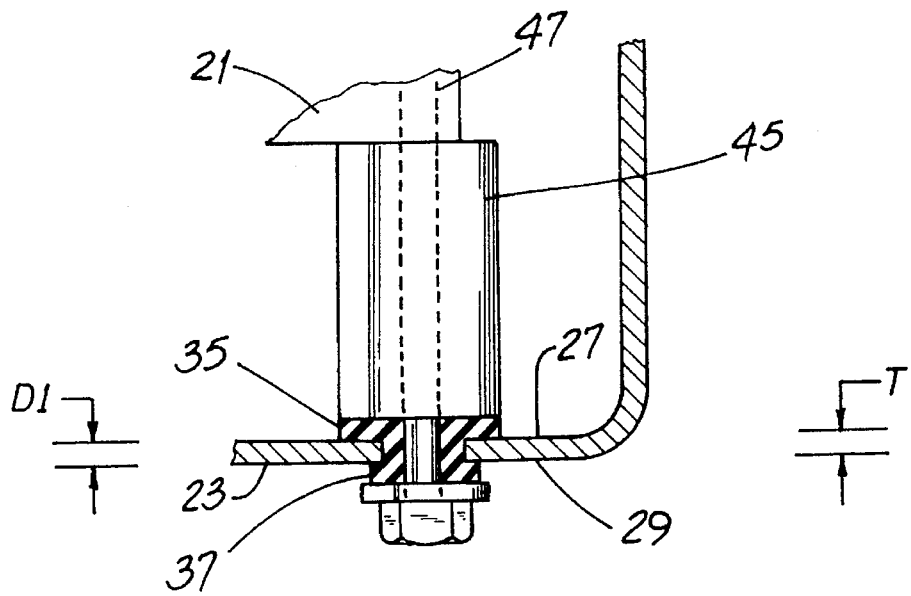
FIG. 3
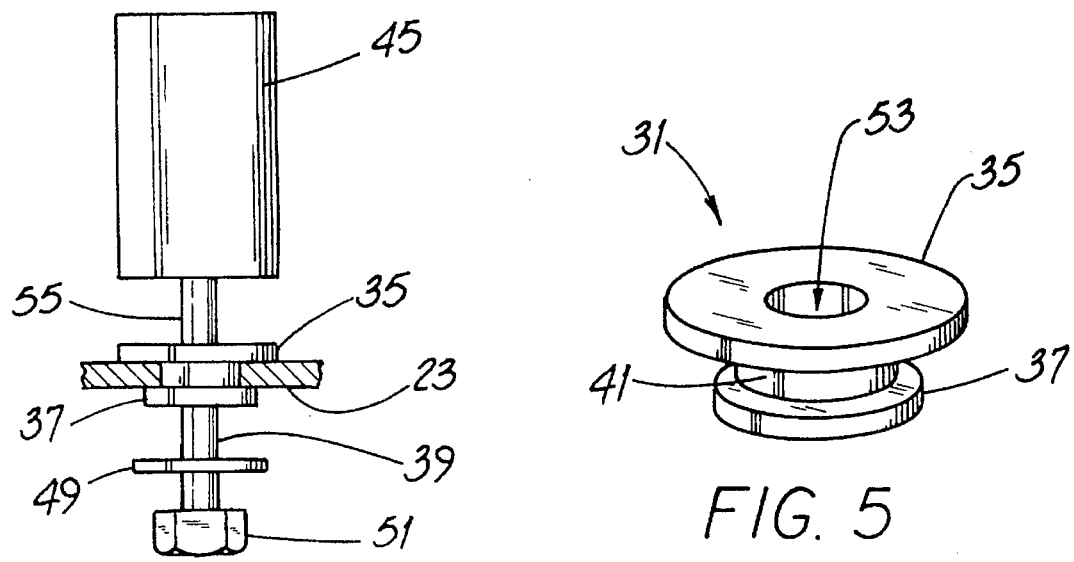
FIG. 4
FIG. 5

5,566,047

ELECTRICAL APPARATUS WITH NOISE-SUPPRESSING FEATURE

FIELD OF THE INVENTION

This invention relates generally to electricity and, more particularly, to electrical systems and devices.

BACKGROUND OF THE INVENTION

Broadly defined, electrical systems and devices are of the direct current (DC) or alternating current (AC) type. Of the two types, AC systems and devices are used predominantly if not almost exclusively to power residential, commercial and industrial electric motors, appliances, light fixtures and the like.

AC devices often use some sort of laminated structure to help reduce eddy current losses. For example, transformers have laminated cores and AC motors use laminated stators and rotors. But such loss reduction is not without its price — the laminated device often exhibits what is referred to as "AC hum." In many situations, AC hum is either not audible or is barely audible to humans. This may be because the AC device is physically small and of low power. Or the AC hum may be masked by other sounds.

On the other hand, higher-power AC devices such as large transformers, ballasts for industrial lighting fixtures and similar devices exhibit an audible AC hum. For grounding and heat transfer purposes, ballasts with exposed laminated cores are often mounted with the ballast windings protruding parallel to a housing surface and a flat surface of the core abutted against the surrounding metal housing. The minute vibrations of the core laminations are thereby amplified by such housing. The sound level produced by a transformer or ballast alone may be relatively innocuous but when amplified, such vibrations may be (and often are) annoying to persons nearby.

An electrical apparatus with a feature suppressing noise resulting from AC hum would be a desirable advance in the art.

OBJECTS OF THE INVENTION

It is an object of the invention to provide a noise-suppressed electrical apparatus overcoming some of the problems and shortcomings of the prior art.

Another object of the invention is to provide a noise-suppressed electrical apparatus.

Another object of the invention is to provide an electrical apparatus having a transformer or transformer-like device spaced from the surrounding housing.

Still another object of the invention is to provide a lighting fixture exhibiting significantly-reduced AC hum.

Another object of the invention is to provide a lighting fixture having an AC ballast which is physically isolated from its metal housing. How these and other objects are accomplished will become apparent from the following descriptions and from the drawings.

SUMMARY OF THE INVENTION

The invention involves an AC electrical apparatus such as a lighting fixture with a mounting structure supporting a vibrating device, e.g., a ballast transformer. The improvement comprises a resilient insulator interposed between the device and the mounting structure so that vibrations are isolated from the mounting structure. The new arrangement results in a marked decrease in the audible level of "AC hum" emanating from the apparatus.

In a more detailed aspect, the device and the mounting structure are attached to one another by a fastener such as a bolt and the insulator (and, specifically, the tubular elongate component of such insulator) is interposed "sleeve-like" between the fastener and the mounting structure. In instances where the mounting structure and fastener are metal, the device and the mounting structure are thereby electrically isolated from one another.

In a specific embodiment, the mounting structure is a generally-flat metal panel and includes first and second surfaces. The insulator has a first disc-like component interposed between the device and the first surface and, most preferably, also has a second disc-like component interposed between the fastener and the second surface. The tubular elongate component extends between the two components and joins them together. And the spacing between the first and second components is substantially equal to the thickness of the mounting structure. While an alternate embodiment may include an insulator formed in two or three pieces, a one-piece insulator (like that described above) is preferred.

And that is not all. The fastener has a rotatable head compressing the insulator and a relatively-rigid spacer disc is between the head and the insulator. Load forces imposed by the head are distributed across the second component of the insulator, i.e., that component between the head and the mounting structure, and the head is prevented from damaging the insulator.

Further details of the invention are set forth in the following detailed description and in the drawing.

BRIEF DESCRIPTION OF THE DRAWINGS

FIG. 3 is an enlarged view, partly in cross-section, of a portion of the view of FIG. 2.

FIG. 4 is a view of the components shown in FIG. 3 in a spaced-apart arrangement.

FIG. 5 is a perspective view of the insulator used with the new apparatus.

DETAILED DESCRIPTION OF PREFERRED EMBODIMENTS

Figure 1:
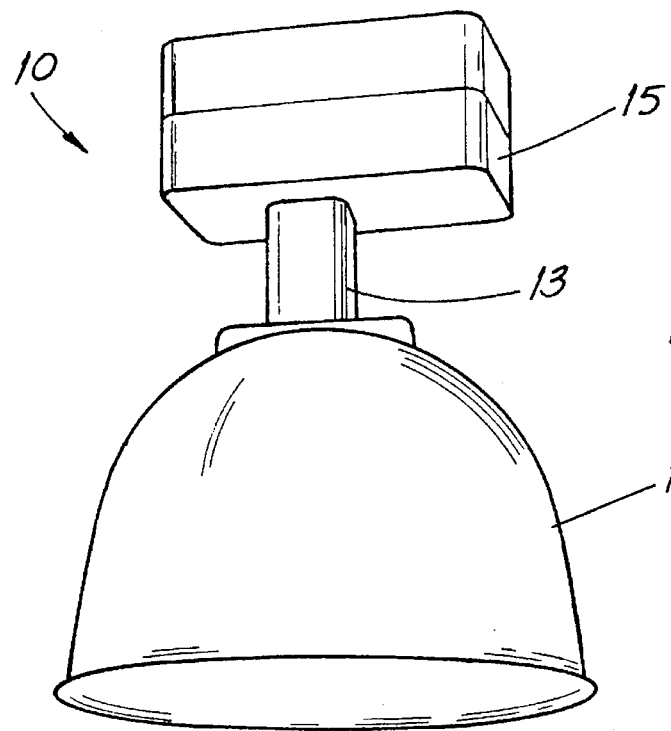
FIG. 1 is a perspective view of an exemplary industrial lighting fixture with which the inventive apparatus may be used.
Figure 2:
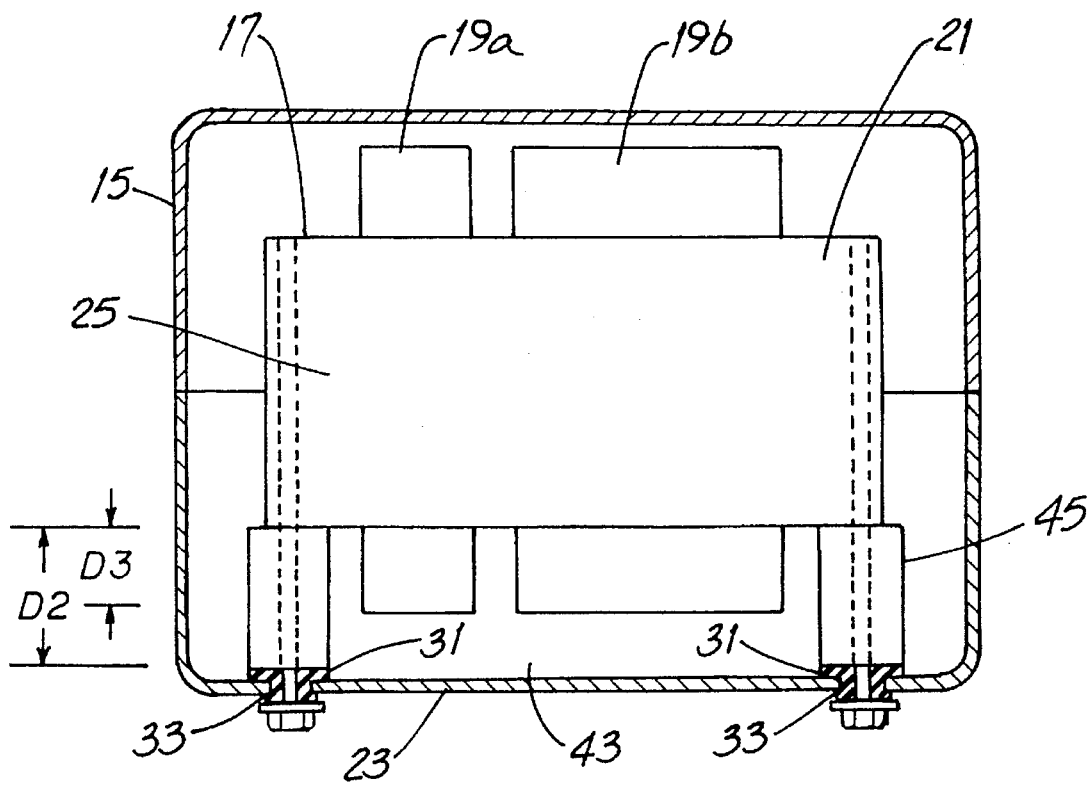
FIG. 2 is a view, partly in cross-section, of the new apparatus.

Before describing details of the new electrical apparatus, it will be helpful to have an understanding of one type of specific apparatus 10 which advantageously incorporates the invention. Referring first to FIG. 1, an industrial lighting fixture 10 has a downwardly-directed reflector 11 of either the opaque or clear prismatic type. Such reflector 11 is suspended from the lower end of a column 13, the upper end of which is attached to the ballast housing 15. In a specific embodiment, such housing 15 is made of metal.

Referring also to FIGS. 2, 3, 4 and 5, a transformer ballast device 17 has donut-like ballast windings 19a, 19b extending away from two opposed sides of the laminated core 21. In a conventional arrangement (not shown), it was required that such windings 19a, 19b be oriented generally parallel to the housing panel 23 so that a surface 25 of the core 21 could be placed in physical heat-transferring contact with such panel 23. Significant AC hum often resulted from such direct core-panel contact. In the invention, such windings 19a, 19b extend toward and away from the panel 23 (up and down in the view of FIG. 2) rather than parallel thereto.

The housing panel 23 has a first surface and a second surface 27 and 29, respectively. In the illustrated embodiment, such surfaces 27, 29 constitute the upper and lower surfaces of such panel 23. A resilient insulator 31 is received in each of two or more openings 33 in the panel 23.

The insulator 31 has a first component 35 interposed between the device 17 and the first surface 27 and a second component 37 interposed between the second surface 29 and a fastener 39 securing the device 17 to the housing 15. In a highly preferred embodiment the components 35, 27 are of substantially uniform thickness and annular. An elongate tubular component 41 extends between the components 35 and 37 and, preferably, the component 41 is joined to the components 35 and 37 to form a one-piece insulator 31, preferably made of silicone. In a specific embodiment, the dimension D1 between the components 35, 37 is about equal to the thickness T of the panel 23.

To provide a space 43 accommodating the protruding ballast windings 19a, 19b a tubular stand-off spacer 45 is mounted between the first component 35 and the core 21 of the device 17. Such spacer 45 has a dimension D2 along its length which is somewhat greater than the protrusion dimension D3 of the ballast windings 19a, 19b. The spacer 45 may be made of any rigid material, e.g., steel.

The fastener 39 comprises a bolt threaded into a tapped hole 47 in the core 21 of the device 17 and an annular spacer disc 49 is between the bolt head 51 and the second component 37. The spacer disc 49, preferably made of a material significantly harder than that used to make the insulator 31, performs two functions. One is to distribute across the second component 37 the force imposed by the bolt head 51 when the bolt is tightened. Another function is to prevent such second component 37 from being damaged by corners on the bolt head 51 when the bolt is tightened.

It is to be noted that the fastener 39 extends through the central openings 53 in the components 35, 37 and 41 and the bolt shank 55 is spaced from the panel 23 as it passes through the panel 23. The bolt head 51 is prevented by the second component 37 from contacting the panel 23. Thus, the fastener 39 is both electrically and mechanically insulated from the panel 23.

Using the new electrical apparatus 10 results in (or is likely to result in) the device 17 exhibiting a somewhat higher operating temperature than if the core 21 of such device 17 abuts the panel 23. However, the offsetting advantage is that the insulator 31 effects a substantial reduction in the level of AC hum exhibited by the apparatus 10. And because there is no metal-to-metal contact between the device 17 and the panel 23, it is or may be desirable to ground the device 17 to the housing 15 using a separate grounding lead (not shown).

While the principles of the invention have been disclosed in connection with a specific embodiment, it is to be understood clearly that such embodiment is exemplary and not limiting.

What is claimed:

1. In a lighting fixture including a ballast and a lower horizontal housing panel supporting the ballast, the improvement wherein;

the ballast has a laminated core resting atop a rigid spacer and has windings protruding below the laminated core;

the spacer rests atop a component of a resilient insulator mounted to the housing panel;

the spacer has a height and the component has a thickness;

the height of the spacer and the thickness of the component are selected to maintain the windings in spaced relationship with respect to the panel;

a fastener extends through the panel, the insulator and the spacer and threads to the core;

the fastener, the insulator, the spacer and the core are in vertical alignment with one another; and the weight of the ballast is supported by the spacer and the component beneath the ballast, whereby vibrations of the core are isolated from the housing panel.

2. The lighting fixture of claim 1 wherein:

the component is a first annular component;

the insulator includes a second annular component; and the components are of differing diameter.

3. The lighting fixture of claim 1 wherein:

the component has a diameter the spacer has a diameter; and the diameter of the component is substantially equal to the diameter of the spacer.

4. The lighting fixture of claim 3 wherein:

the component is a first annular component;

the insulator includes a second annular component; and the components are of differing diameter.

5. The lighting fixture of claim 1 wherein:

the housing panel is part of a housing around the ballast;

the component is a first annular component inside the housing;

the insulator includes a second annular component outside the housing;

the diameter of the second annular component is less than the diameter of the first annular component;

the fastener is a bolt having a head;

a spacer disc contacts the head and the second annular component; and the diameter of the spacer disc is greater than the diameter of the second annular component.

* * * * *